United States Patent Office 3,108,102
Patented Oct. 22, 1963

3,108,102
3-HYDROXYPYRIDO[2,3-e]-as-TRIAZINE 1-OXIDE AND RELATED COMPOUNDS
John Anthony Carbon, Lake Bluff, Ill., assignor to Abbott Laboratories, North Chicago, Ill., a corporation of Illinois
No Drawing. Filed Feb. 8, 1962, Ser. No. 171,805
4 Claims. (Cl. 260—249.5)

This invention is concerned with compounds of the formula

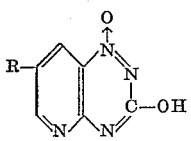

and a method for their preparation. In this and succeeding formulas, R is hydrogen, lower alkyl of from 1 to 4 carbon atoms or halogen, such as chlorine, bromine, fluorine and iodine. These compounds are useful as tranquilizers and antibacterial agents. In a representative operation, an aqueous composition containing 50 parts per million of 3-hydroxy-7-methylpyrido[2,3-e]-as-triazine 1-oxide gave excellent control of *Staphylococcus aureus*.

The compounds of this invention can be prepared by heating on a steam bath a compound of the formula

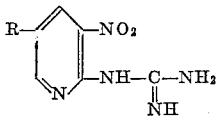

admixed with water in the presence of a catalyst such as an alkali metal carbonate, preferably potassium carbonate, to obtain the intermediate 3-amino derivative of the formula

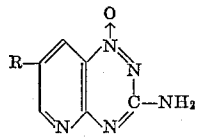

which is thereafter reacted at about 20° C. with an alkali metal nitrite in an acidified aqueous medium. The products are crystalline, yellow solids and can be readily separated by filtration and recrystallized from a suitable solvent or by dissolving in alkali and acidifying with an acid such as acetic acid.

The examples which follow are intended to illustrate rather than limit the invention.

EXAMPLE 1

*3-Hydroxypyrido[2,3-e]-as-Triazine 1-Oxide*

A mixture of 5 g. of 2-guanidino-3-nitropyridine hydrochloride, 15 g. of potassium carbonate and 50 ml. of water was heated on the steam bath with vigorous stirring for 6.5 hours. The reaction mixture was then cooled to 5° C. to precipitate the intermediate 3-aminopyrido[2,3-e]-as-triazine 1-oxide which after separation by filtration and recrystallization from water melted at 256°–257° C. with decomposition and analyzed 43.03% nitrogen compared to the calculated value of 42.94% nitrogen. A solution of 50 g. (0.31 mole) of this intermediate in 560 ml. of water and 140 ml. of concentrated sulfuric acid was cooled to 20° C. and a solution of 31.5 g. (0.46 mole) of sodium nitrite in 60 ml. of water slowly added with stirring over a 30 minute period. After standing for one hour at room temperature, the desired 3-hydroxypyrido-[2,3-e]-as-triazine 1-oxide which precipitated from the reaction mixture was purified by dissolving it in aqueous alkali and acidifying with acetic acid. M.P.=235°–237° C. with decomposition. N (calc'd)=34.15%; N (found)=34.03%.

EXAMPLE 2

By substituting 2-guanidino-3-nitro-5-methylpyridine for the 2-guanidino-3-nitropyridine in the procedure of Example 1, there is obtained the intermediate 3-amino-7-methylpyrido[2,3-e]-as-triazine 1-oxide melting at 267°–268° C. which when further reacted with potassium nitrite yields 3-hydroxy-7-methylpyrido[2,3-e]-as-triazine 1-oxide melting at 230°–231° C. with decomposition.

The reaction of aqueous alkali with 2-guanidino-3-nitro-5-ethylpyridine, 2 - guanidino - 3 - nitro - 5 - propylpyridine or 2-guanidino-3-nitro-5-butylpyridine results in the formation of the intermediate 3-amino-7-ethylpyrido[2,3-e]-as-triazine 1-oxide, 3-amino-7-propylpyrido[2,3-e]-as-triazine 1-oxide or 3-amino-7-butylpyrido[2,3-e]-as-triazine 1-oxide respectively which when reacted with an alkali metal nitrite produces 3-hydroxy-7-ethylpyrido-[2,3-e]-as-triazine 1-oxide, 3-hydroxy-7-propylpyrido[2,3-e]-as-triazine 1-oxide, or 3-hydroxy-7-butylpyrido[2,3-e]-as-triazine 1-oxide, respectively.

EXAMPLE 3

The substitution of 2-quanidino-3-nitro-5-chloropyridine for 2-quanidino-3-nitropyridine in Example 1 results in the production of the intermediate 3-amino-7-chloropyrido[2,3-e]-as-triazine 1-oxide melting at 260° C. with decompoistion which when reacted with sodium nitrite produces 3-hydroxy-7-chloropyrido[2,3-e]-as-triazine 1-oxide having a molecular weight of 198.

The reaction of aqueous alkali with 2-guanidino-3-nitro - 5 - bromopyridine, 2 - guanidino - 3 - nitro - 5-fluoropyridine or 2-guanidino-3-nitro-5-iodopyridine will produce the intermediate 3-amino-7-bromopyrido[2,3-e]-as-triazine 1-oxide, 3-amino-7-fluoropyrido[2,3-e]-as-triazine 1-oxide or 3-amino-7-iodopyrido[2,3-e]-as-triazine 1-oxide, respectively. The reaction of these intermediates with sodium nitrite provides the desired 3-hydroxy-7-bromopyrido[2,3-e]-triazine 1-oxide, 3-hydroxy-7-fluoropyrido[2,3e]-as-triazine 1-oxide or 3-hydroxy-7-iodopyrido[2,3-e]-as-triazine 1-oxide, respectively.

Compounds of the formula

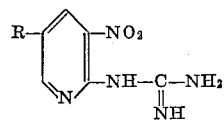

employed as starting materials in this invention are prepared by refluxing two parts of guanidine with one part of a compound of the formula

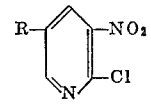

in t-butyl alcohol and separating the solid product which forms. Thus, 2-guanidino-4-nitropyridine melts at 143°–144° C. whereas 2-guanidino-3-nitro-5-methylpyridine melts at 145°–147° C. and 2-guanidino-3-nitro-5-chloropyridine melts at 134°–135° C.

What I claim is:

1. A compound of the formula

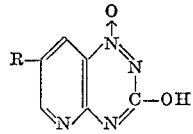

wherein R is a member of the group consisting of hydrogen, lower alkyl and halogen.

2. 3-hydroxypyrido[2,3-e]-as-triazine 1-oxide.
3. 3-hydroxy-7-methylpyrido[2,3-e]-as-triazine 1-oxide.
4. 3-hydroxy-7-chloropyrido[2,3-e]-as-triazine 1-oxide.

References Cited in the file of this patent

Erickson et al.: The 1,2,3- and 1,2,4-Triazines, Tetrazines and Pentazines, Interscience Pub. Inc., New York, 1956, pages 101–103.